UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,028,637. Specification of Letters Patent. Patented June 4, 1912.

No Drawing. Original application filed February 28, 1911, Serial No. 611,361. Divided and this application filed September 6, 1911. Serial No. 647,947.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Vat Dye, of which the following is a specification.

My invention relates to the manufacture and production of new vat dyestuffs of the anthraquinone series, and this application is a divisional application of my pending application Ser. No. 611361 filed Feb. 28, 1911, in which I described the corresponding single condensation by means of monomercaptans.

The process for their production consists in condensing by means of sulfuric acid anthraquinone dimercaptans with 2 molecules of oxyanthraquinones or dioxyanthraquinones with 2 molecules of anthraquinone mercaptans.

The new dyes having most probably the formula:

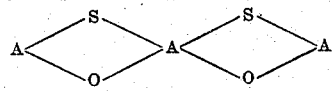

(A meaning an anthraquinone radical) are after being dried and pulverized reddish to brown powders soluble in concentrated sulfuric acid generally with from a green to greenish-blue coloration; dyeing cotton from an alkaline hydrosulfite vat from red to brown shades.

In order to illustrate the new process more fully the following example is given, the parts being by weight:—3 parts of anthraquinone-1.5-dimercaptan and 8 parts of alpha-oxyanthraquinone are heated to 160–170° C. with 100 parts of a 98 per cent. sulfuric acid until the melt has assumed a green coloration and the quantity of the dyestuff formed does no longer increase. The melt is diluted with 1000 parts of water, the dye is filtered off and boiled with dilute caustic soda lye. It can be purified by treating it with an alkaline solution of sodium hypochlorite. It forms a reddish-brown powder soluble in boiling naphthalene with a brown-orange coloration and in concentrated sulfuric acid with a green coloration. It dyes cotton from an alkaline hydrosulfite vat brown shades, turning Bordeaux red by rinsing and soaping.

The dye has most probably the formula:

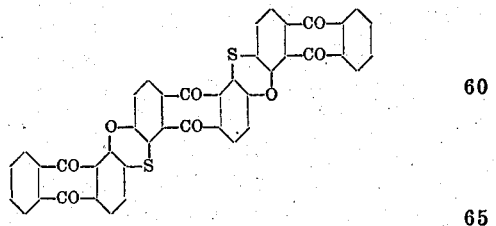

Other oxyanthraquinones can be used *e. g.* 2-oxyanthraquinone, dioxyanthraquinones *e. g.* anthrarufin, anthraflavinic acid, or on using other anthraquinone dimercaptans. 2 mols. of monomercaptans can also be condensed with a dioxyanthraquinone.

I claim:—

1. The herein described new vat dyes having most probably the formula:

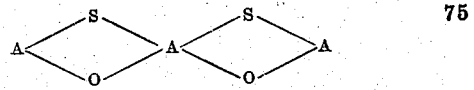

A meaning an anthraquinone radical which dyes are after being dried and pulverized reddish to brown powders soluble in concentrated sulfuric acid generally with from a green to greenish-blue coloration; dyeing cotton from an alkaline hydrosulfite vat from red to brown shades, substantially as described.

2. The herein described new vat die having most probably the formula:

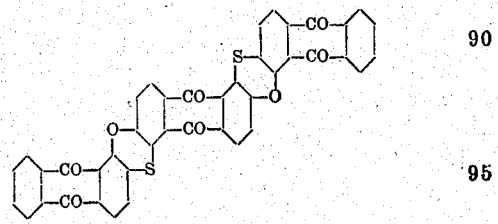

which forms a reddish-brown powder soluble in boiling naphthalene with a brown-orange coloration, and dyeing cotton from a hydrosulfite vat Bordeaux-red shades, substantially as described.

In testimony whereof I have hereunto set my hand in the presence of two subscribing witnesses.

PAUL THOMASCHEWSKI. [L. S.]

Witnesses:
L. NUFER,
ALBERT F. NUFER.